(12) United States Patent
Kong et al.

(10) Patent No.: US 11,701,800 B2
(45) Date of Patent: Jul. 18, 2023

(54) SYSTEMS AND METHODS FOR RECONDITIONING POLYMERIC WHEELS

(71) Applicant: Roller Labz, LLC, Laguna Niguel, CA (US)

(72) Inventors: Michael Kong, Laguna Niguel, CA (US); Robert Pecor, Aliso Viejo, CA (US)

(73) Assignee: Roller Labz, LLC, Laguna Niguel, CA (US)

( * ) Notice: Subject to any disclaimer, the term of this patent is extended or adjusted under 35 U.S.C. 154(b) by 323 days.

(21) Appl. No.: 16/732,912

(22) Filed: Jan. 2, 2020

(65) Prior Publication Data
US 2020/0215729 A1    Jul. 9, 2020

Related U.S. Application Data

(60) Provisional application No. 62/788,171, filed on Jan. 4, 2019.

(51) Int. Cl.
| | |
|---|---|
| *B29C 35/08* | (2006.01) |
| *B29C 35/00* | (2006.01) |
| *B29C 35/16* | (2006.01) |
| *B29L 31/32* | (2006.01) |

(52) U.S. Cl.
CPC ........ *B29C 35/0805* (2013.01); *B29C 35/002* (2013.01); *B29C 35/16* (2013.01); *B29C 2035/0822* (2013.01); *B29C 2035/1666* (2013.01); *B29L 2031/322* (2013.01)

(58) Field of Classification Search
None
See application file for complete search history.

(56) References Cited

U.S. PATENT DOCUMENTS

| | | | |
|---|---|---|---|
| 2,241,685 A | * | 5/1941 | Ware ...................... A63C 17/22 301/5.304 |
| 2,259,883 A | | 10/1941 | Gleba |
| 2,425,332 A | | 8/1947 | Langdon |

(Continued)

FOREIGN PATENT DOCUMENTS

| | | |
|---|---|---|
| CN | 2566667 Y | 8/2003 |
| CN | 102040720 A | 5/2011 |

(Continued)

OTHER PUBLICATIONS

Machine English translation of DE102013223461, Accessed Nov. 30, 2021 (Year: 2015).*

(Continued)

*Primary Examiner* — Jacob T Minskey
*Assistant Examiner* — Adrianna N Konves
(74) *Attorney, Agent, or Firm* — Blair Walker IP Services, LLC

(57) ABSTRACT

A method for reconditioning a rollable wheel includes coupling a polymeric wheel to a reconditioning system, the polymeric wheel having an outer surface including an abraded area, the abraded area having a first average surface roughness, and applying heat to the abraded area of the outer surface with one or more heater of the reconditioning system, such that a substantial portion of the abraded area is transformed to have a second average surface roughness, the second average surface roughness less than the first average surface roughness.

24 Claims, 10 Drawing Sheets

(56) References Cited

U.S. PATENT DOCUMENTS

| | | | |
|---|---|---|---|
| 5,312,844 A | | 5/1994 | Gonsior et al. |
| 5,567,019 A | * | 10/1996 | Raza ............... A63C 17/223 |
| | | | 301/5.307 |
| 6,811,524 B2 | | 11/2004 | Zimmermann |
| 8,602,504 B2 | | 12/2013 | Xie |
| 2003/0049377 A1 | | 3/2003 | Chesnut et al. |
| 2006/0086720 A1 | | 4/2006 | Nakase et al. |
| 2009/0136605 A1 | | 5/2009 | Kawasaki |
| 2009/0278271 A1 | | 11/2009 | Wolfe et al. |
| 2016/0038969 A1 | | 2/2016 | Schmitt |
| 2017/0192387 A1 | | 7/2017 | Tanaka |

FOREIGN PATENT DOCUMENTS

| | | | | | |
|---|---|---|---|---|---|
| CN | 101747618 B | | 11/2011 | | |
| CN | 104118274 A | | 10/2014 | | |
| DE | 102013223461 A1 | * | 5/2015 | ........... | H01L 23/367 |
| KR | 200271530 | * | 4/2002 | | |
| KR | 20110027970 A | | 3/2011 | | |

OTHER PUBLICATIONS

Machine English translation of KR200271530, Accessed Nov. 30, 2021 (Year: 2002).*
CN101747618B, Machine translation (9 pages).
CN102040720A, Machine translation (8 pages).
CN104118274A, English abstract (1 page).
KR20110027970A, Machine translation (11 pages).
Williams, C., "Inline Skate Wheels 101," downloaded from internet Jan. 7, 2020. https://www.liveabout.com/inline-skate-wheels-4122926.
Thomas, B., Martinez, S., Hadfield, M., "Potential application of recycled plastic materials as a replacement for polyurethane wheels," WIT Transactions on Engineering Sciences, 76: (2012) (13 pages) WIT Press, www.witpress.com.
PCT International Search Report and Written Opinion forPCT/US2020/021224, Applicant: Roller Labz, LLC, Forms PCT/ISA/220, 210, and 237 dated Apr. 27, 2020 (15 pages).
Extended European Search Report dated Feb. 4, 2022, in EP App. No. 20736099.1 filed Jan. 3, 2020 (6 pages).
"The History of Skateboard Wheels" IQS Newsroom, downloaded Jul. 23, 2021 from htttps://blog.iqsdirectory.com/polyurethane-rollers-2/ (1 page).

* cited by examiner

US 11,701,800 B2

SYSTEMS AND METHODS FOR RECONDITIONING POLYMERIC WHEELS

INCORPORATION BY REFERENCE TO ANY PRIORITY APPLICATIONS

This application claims the benefit of priority to U.S. Provisional Patent Application No. 62/788,171, filed on Jan. 4, 2019, which is incorporated by reference herein in its entirety for all purposes. Priority is claimed pursuant to 35 U.S.C. § 119.

BACKGROUND OF THE INVENTION

Field of the Invention

The field of the invention generally relates to systems and methods for reconditioning polymeric wheels.

SUMMARY OF THE INVENTION

In a first embodiment of the present disclosure, a method for reconditioning a rollable wheel includes coupling a polymeric wheel to a reconditioning system, the polymeric wheel having an outer surface including an abraded area, the abraded area having a first average surface roughness, and applying heat to the abraded area of the outer surface with one or more heater of the reconditioning system, such that a substantial portion of the abraded area is transformed to have a second average surface roughness, the second average surface roughness less than the first average surface roughness.

In another embodiment of the present disclosure, a method for reconditioning one or more rollable wheels of a roller skate includes obtaining a skate having a foot attachment portion having one or more polymeric wheels coupled thereto and rotatable thereon, at least one of the one or more polymeric wheels having an outer surface including an abraded area, coupling the skate to a reconditioning system, applying heat to the abraded area of the outer surface with one or more heater of the reconditioning system while rotating the at least one of the one or more polymeric wheels, such that an average surface roughness of the abraded area is reduced, and removing the skate from the reconditioning system.

In still another embodiment of the present disclosure, a reconditioning system configured to recondition one of more rollable wheels of a roller skate includes a skate holder configured to statically support a skate having one or more polymeric wheels, such that at least one of the one or more polymeric wheels is rotatable, the at least one of the one or more polymeric wheels having an outer surface, one or more heater configured to apply heat to at least a portion of the outer surface, a rotator configured to rotate the at least one of the one or more polymeric wheels while the one or more heaters apply heat, and a timer configured to control the operation of at least one of the one or more heaters and rotator.

In yet another embodiment of the present disclosure, a reconditioned polymeric wheel includes a generally toroidal body having an outer surface including a rolling contact portion configured to provide rolling contact with a ground surface, the rolling portion including a heat-reconditioned surface.

In still another embodiment of the present disclosure, a reconditioned polymeric wheel having a generally toroidal body having an outer surface includes a rolling contact portion, the rolling portion including a reconditioned surface provided by the method of coupling the polymeric wheel to a reconditioning system, and applying heat to a portion of the outer surface with one or more heater of the reconditioning system, such that a substantial portion of the portion of the outer surface is transformed to have a lowered average surface roughness.

In yet another embodiment of the present disclosure, a method for reconditioning a rollable wheel includes coupling a polymeric wheel to a reconditioning system, the polymeric wheel having an outer surface including an abraded area, the abraded area, and applying heat to the abraded area of the outer surface with one or more heater of the reconditioning system, such that a substantial portion of the abraded area is caused to reform, reflow, or otherwise change its morphology or characteristics, such that the outer surface at the abraded are becomes smoother, wherein the application of heat does not cause an inner portion of the wheel to significantly deform.

DETAILED DESCRIPTION OF THE ILLUSTRATED EMBODIMENTS

Figure 1:
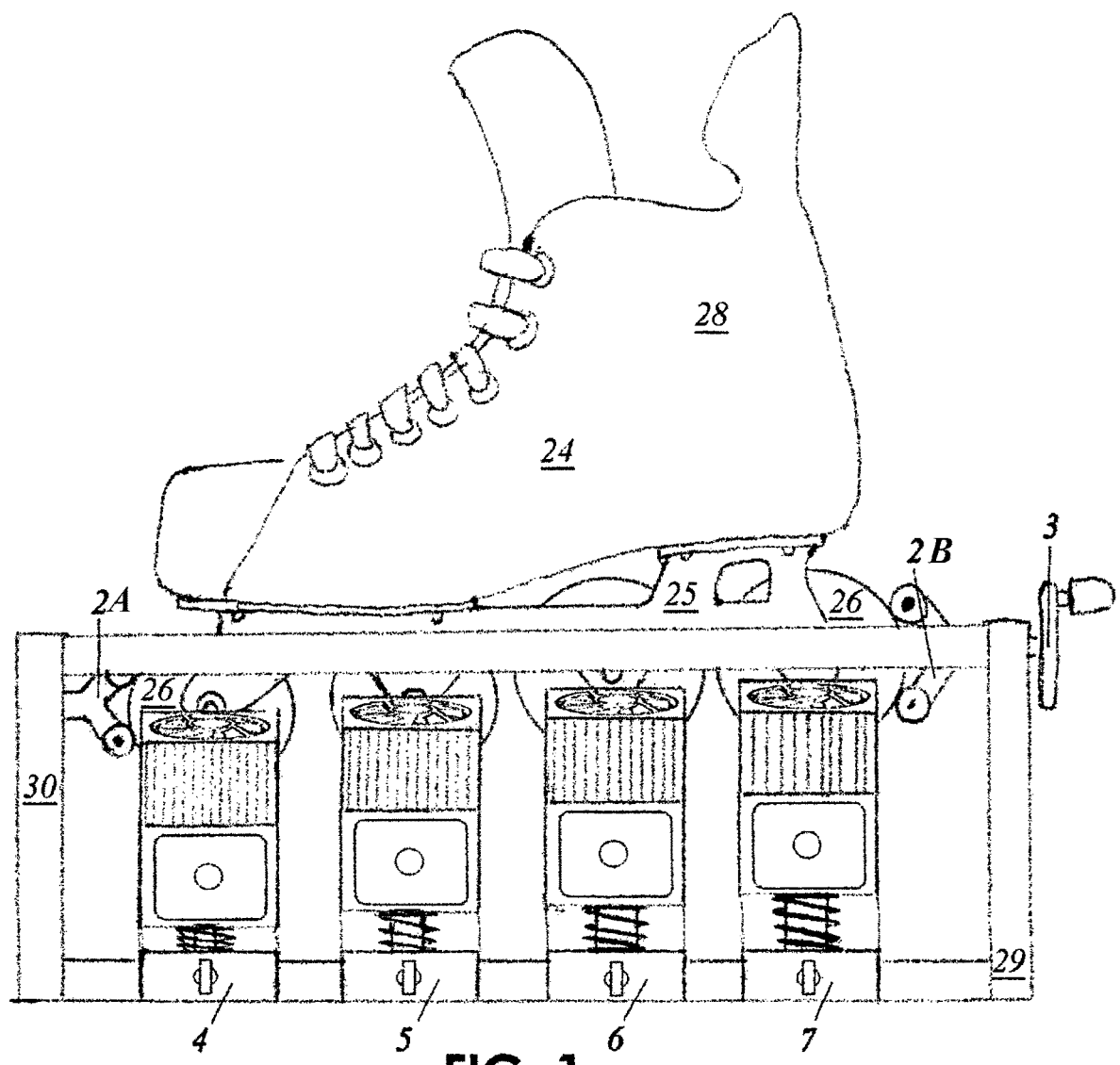
FIG. 1 is a side view of a reconditioning system according to an embodiment of the present disclosure with an in-line skate carried therein.

The present disclosure relates to systems and methods for reconditioning polymeric wheels. A polymeric wheel reconditioning system utilizes one or more heaters to controllably heat a worn wheel surface to reach a temperature at which some reforming of the polymer occurs. Once the temperature is reached and the reforming can occur, the surface is converted from a rough, dull surface with minimized traction to a smoother, clearer surface with significantly improved traction. In some cases, the traction can be improved so that it has a performance close or even indistinguishable from a new wheel.

Polymeric wheels, such as those used on in-line skates, roller skates or skateboards, are susceptible to wearing on the portion of their outer surface that contacts the performance surfaces on which they are used. These surfaces are typically harder than the polymeric wheels themselves, and may include concrete, blacktop, wood (e.g., treated wood such as wood tiles), composite material, high impact polypropylene copolymer tiles, polymeric flooring, or even dirt or stone. The surfaces may be found in parks or recreational areas, such as skateboard and skating parks, roller rinks, roller hockey rinks, or tracks. Skate wheels often comprise toroidal polymeric bodies carried on a hub, separated by bearings and a spacer. Polymeric wheels used in in-line skates, roller skates or skateboards often comprise polyurethane, by may also comprise other polymeric materials. The rolling friction of the contact portion of the wheel surface against the ground or performance surface can cause many types of wear and may also be combined with wear caused by sliding friction. Slippage may unintentionally occur when a user is skating, but slippage or sliding friction may also occur intentionally, when a skater slows or stops using a powerslide or power stop. In many sports, such as roller hockey, the power stop or the hockey stop are a standard part of the game and are regularly performed by players. The result of these many types of friction, either separate or together, cause wear to the wheel surface, wear that tends to increase over time. This may be the case regardless of the durometer of the wheel material. Polyurethane skate wheels are commonly in the range of between about 70A to 100A and commonly have a diameter of between about 55 mm and about 110 mm. In some skates, each of the wheels is the same diameter as each other, but in other skates, more than one diameter wheel may be incorporated. For example, there may be two larger diameter wheels in the middle of the skate and two smaller diameter wheels, one in the front and one in the back. Or, there may be two smaller diameter wheels in the middle of the skate and two larger diameter wheels, one in the front and one in the back. Alternatively, there may be a single smaller diameter wheel in front of three larger diameter wheels. It is common for polymeric wheels to have a polymer ring around a metal hub and bearings. 24 mm is a common wheel width, but this may also be varied.

The surface of a new wheel has a relatively smooth surface with a relatively low average surface roughness. The typical usage can severely increase the average surface roughness of the wheel. Thomas B et al.; *WIT Transactions on Engineering Sciences;* 2012; 76: 99-111 tested characteristics of five different 97A to 99A (Shore A hardness) polyurethane skateboard wheels, one new wheel and four used wheels. Using a Zygo® laser interferometer, two different types of average surface roughness were measured for each wheel, Ra (arithmetic average) and Rrms (root mean square average), based on multiple measurements of profile height deviations from the mean line. The Ra for the new wheel was 0.154 µm, while the Ra for the other four wheels ranged from 4.527 µm to 8.382 µm. The Rrms for the new wheel was 0.214 µm, while the Rrms for the other four wheels ranged from 5.848 µm to 10.550 µm. Thus, in the worn wheels, the average surface roughness was between about 29 to 55 times the new wheel value. In competitive sports, such as roller hockey, wheel performance is a critical factor in overall athletic performance. There are currently no high quality techniques of reconditioning used or worn polymeric wheels, and therefore wearers or users of such wheels are forced to either endure significantly reduced quality and performance, or to replace the wheels. Typically, users who notice the degradation in performance of their wheels purchase entire new sets of wheels (e.g., 3, 4, 5, etc. per skate) to replace to worn wheels on the skate boot. Some users may simply purchase entire new skates. For avid users or highly competitive athletes, the cost of maintaining high performance skates can be considerable.

Figure 2:
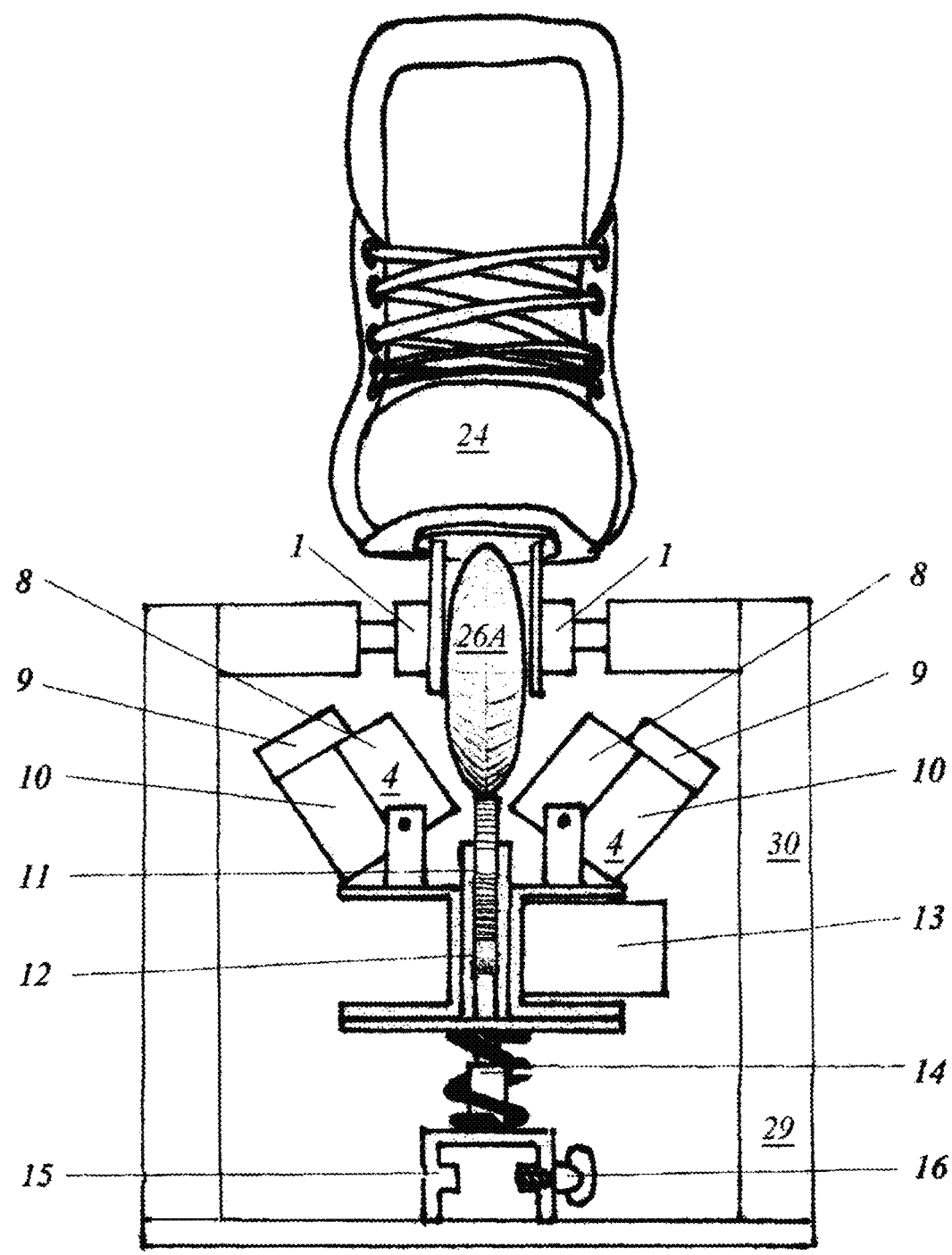
FIG. 2 is a front view of the reconditioning system of FIG. 1.

The embodiments disclosed herein address the need for frequent reconditioning of various types of polymeric wheels. By heating the outer surface of the wheel by one or more of a variety of types of heat transfer (thermal conduction, convection, radiation, or phase changes), the outer surface of the wheel is allowed to reform, reflow, or otherwise change its morphology or characteristics, to provide a smoother, improved surface. FIGS. 1 and 2 illustrate a reconditioning system 30 for reconditioning wheels 26 of an in-line skate 24. The wheels 26 are commonly rotationally secured to a boot 28 of the skate 24 by a frame 25. The reconditioning system 30 is configured to controllably apply heat to a surface of the wheel 26. The reconditioning system comprises a base 29 (e.g., frame) having two lateral holding bars 1 extending generally between a proximal end and a distal end of the base 29. The lateral holding bars 1 are adjustable laterally, by one or more cranks or motors, or are spring-loaded or otherwise biased, such that a longitudinally extending space is presented into which the wheels 26 are placed. In the embodiment of FIGS. 1 and 2, the entire skate 24 is placed with the wheels 26. In alternative embodiments, one or more of the wheels 26 may be removed from the skate 24, and may be rotationally coupled to a dummy skate or form, which may be placed with the wheels 26. In some cases, if the boot 28 of the skate 24 is delicate, valuable, or if it is being reconditioned itself (resewn, bonded, etc.), the wheels 26 may thus be reconditioned without the boot 28. The top portion of the lateral holding bars 1 are capable of supporting the weight of the skate 24, and are adjusted so that the wheels 26 are able to rotate. The lateral holding bars 1 may be adjusted so that the transverse dimension between them is slightly greater than the width or thickness of the wheels 26. Alternatively, the lateral holding bars 1 may be tightened in a compressive manner to grip the frame 25, while allowing free rotation of the wheels 26.

Figure 5:
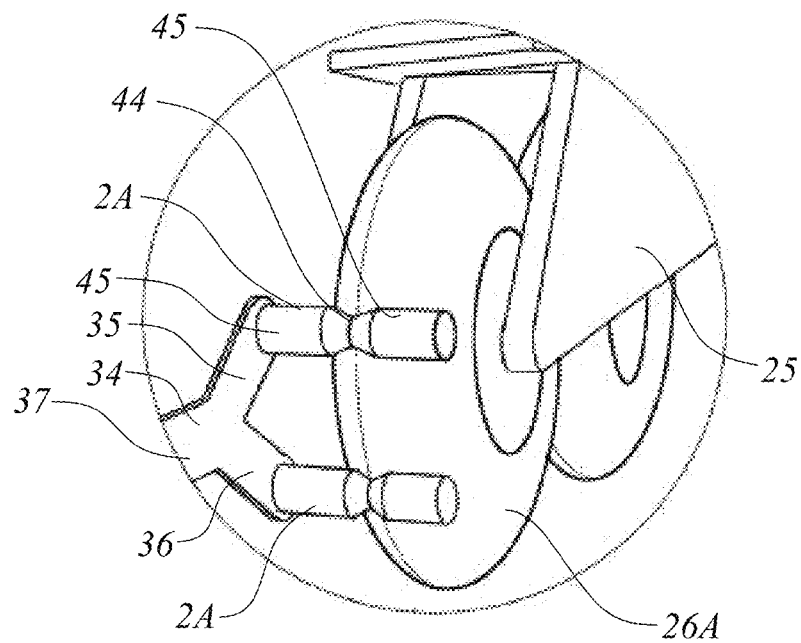
FIG. 5 is a perspective view of roller pins of an adjustable engagement unit of the reconditioning system of FIG. 1 engaged with a polymeric wheel of the in-line skate.
Figure 6:
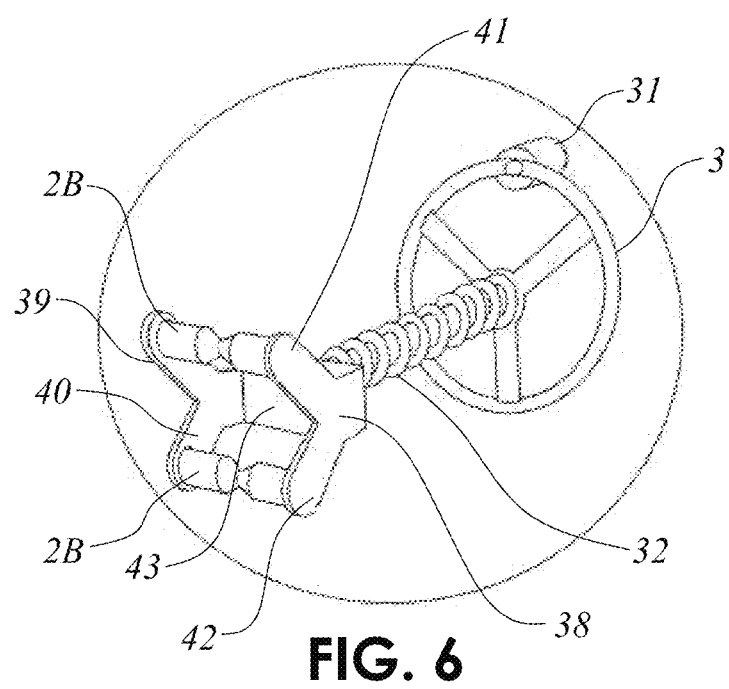
FIG. 6 is a detail perspective view of the adjustable engagement unit.

As shown in FIGS. 1 and 5, a pair of front roller pins 2A are configured to rollably engage a front wheel 26A (FIG. 5) of the skate 24. As shown in FIGS. 1 and 6, a pair of rear roller pins 2B are adjustable via a crank 3 that is coupled to the base 29. The crank 3 may be turned by a crank handle 31, to move the rear roller pins 2B proximally or distally, as the crank may be threadingly engaged with a threaded hole 33 (not shown) in the base 29. The rear roller pins 2B are biased via a spring 32. Thus, after a skate 24 is placed within the reconditioning system 30 with the lateral holding bars 1 adjusted to the appropriate amount to hold the skate 24, the crank 3 is then adjusted so that rear roller pins 2B engage a rear wheel 26 (FIG. 1) and move the skate 24 longitudinally in a distal direction so that the front roller pins 2A engage the front wheel 26A. Thus, the skate is snugly locked and maintained static in relation to the reconditioning system 30, while the wheels 26 are each capable of rotation. The front roller pins 2A are rotationally held by a V-shaped frame 34 having a first arm 35 and a second arm 36 which each extend from a main portion 37. The rear roller pins 2B are rotationally held by a V-shaped frame 38 having first arm 39, second arm 40, third arm 41, and fourth arm 42 which each extend from a main portion 43. Each of the roller pins 2A, 2B include a central reduced diameter portion 44 (FIG. 5)

which tapers down from lateral increased diameter portions 45. Thus, when the crank 3 is adjusted, the skate 24 is locked in place longitudinally, as the distance between each longitudinally corresponding pair of roller pin 2A and roller pin 2B is less than the maximum distance between the front wheel 26 and the rear wheel 26. However, each wheel 26 maintains its ability to be rotated.

The reconditioning system 30 of FIGS. 1 and 2 is capable of reconditioning each of the four wheels 26 of the skate 24 at the same time. Individual heating and rotation units 4, 5, 6, 7 are carried by the base 29, with each configured to treat a different wheel 26. FIG. 2 illustrates further detail of the front heating and rotation unit 4, with the front roller pins 2A removed for clarity purposes. A clamp 15 having a locking nut 16 holds a suspension system 14 to the base 29. Alternative securement arrangements may also be utilized. The suspension system 14 may be vertically adjustable and may include a spring and a telescoping rod, as shown. The suspension system 14 is configured to place an ample amount of pressure on the wheel 26, but to protect against large stresses which could damage the wheel 26, either when it is at an elevated temperature or not. An infrared heater 8 and a cooling fan 9 are each carried on a left side and a right side by the suspension system 14. The infrared heater 8 may be replaced with or augmented with other types of heaters including a pressurized hot air gun, a ceramic heater, a resistive heater, or other heater known in the art. The cooling fan 9 may be replaced with or augmented with other types of coolers, such as forced water or air, e.g., one or more fluid jet (e.g., via a nozzle or tube). The infrared heater 8 is configured to apply heat to the surface of the wheel 26. The cooling fan 9 is configured to remove excess heat from the wheel 26. The infrared heater 8 and cooling fan 9 may be used serially, such that the infrared heater 8 first heats the wheel 26 to an elevated temperature, and then the cooling fan 9 cools the wheel 26, thus lowering its temperature. Alternatively, the cooling fan 9 may be operated at least some of the time that the infrared heater 8 is being used, so that the infrared heater 8 is able to add heat to the wheel 26, while the cooling fan 9 acts as a buffer to assure that the wheel 26 is not heated above a desired target temperature. A heat sink 10 can also be carried by the suspension system 14 to conductively remove excess heat from the wheel 26. The heat sink 10 may comprise a conductive material such as a conductive metal (aluminum, copper, aluminum alloys, copper alloys, and other metals). In some embodiments, a heat pipe may be used along with the heat sink 10 if a significant amount of heat removal is required.

The cooling fan 9 (or other cooler) and/or the heat sink 10 may also be used simultaneously with the infrared heater 8 (or other heater) so that heat is applied only on a specific area of the surface of the wheel 26, while protecting another portion of the surface of the wheel 26 from the heat. Thus, the heated and non-heated zones on the wheel 26 can be precisely controlled. The precise control of heat application aids in also allowing a relatively thin surface thickness to be heated such that it can reform, reflow, or otherwise change its morphology, while protecting the bulk of the wheel 26 from reaching temperatures which would deform the wheel 26. Thus, the wheel 26 does not significantly deform, but the outer surface is reconditioned for improved performance. This is somewhat analogous, though in a non-limiting way, of something being "seared" or "flame-broiled" without being "baked." The cooling fan 9 and heat sink 10 are each optional, because in some embodiments, natural cooling may be acceptable. Alternatively, the wheel 26 may simply be removed and dropped into a fluid having a particular temperature, such as room temperature water, or ice water.

Figure 3:
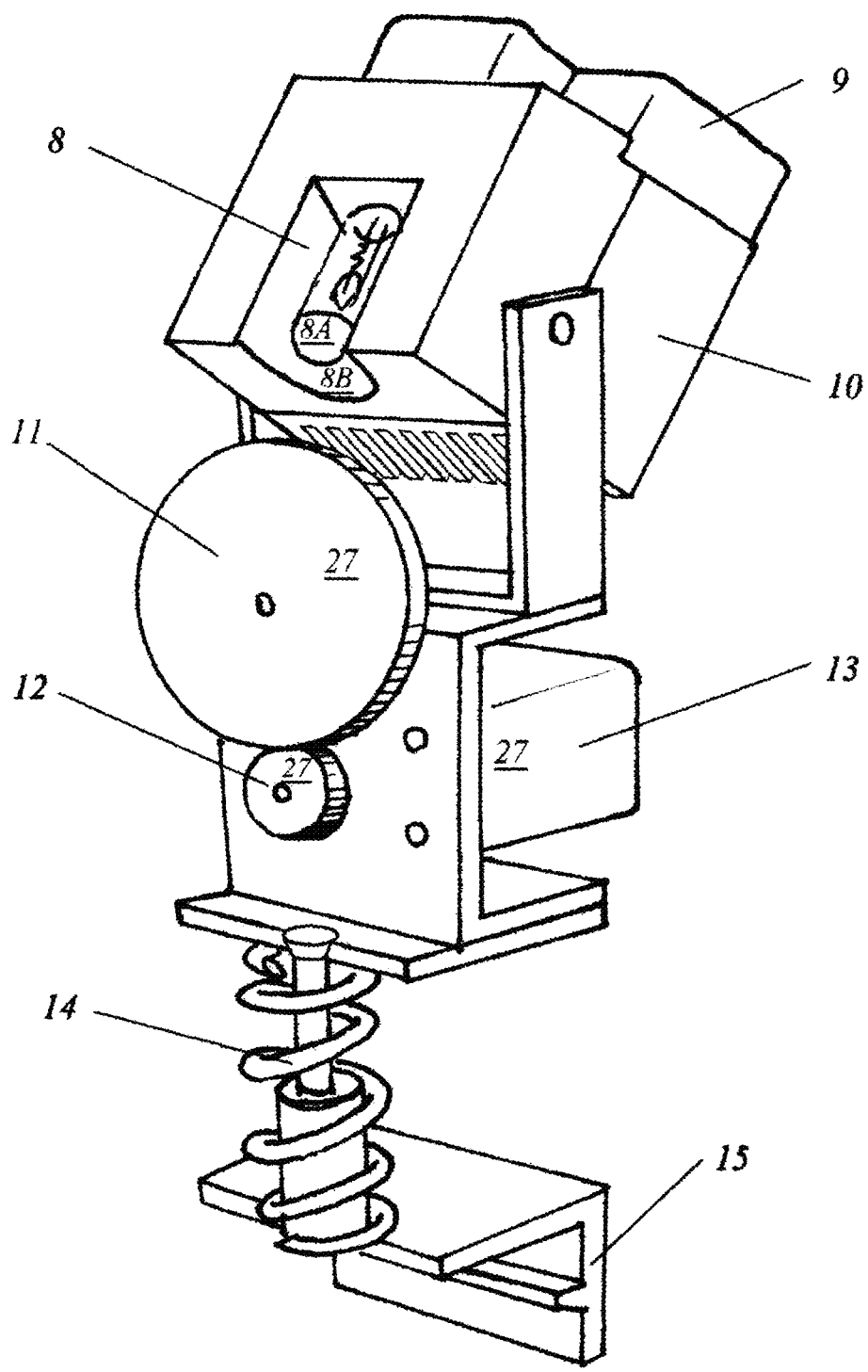
FIG. 3 is a perspective view of a heating and rotation unit of the reconditioning system of FIG. 1.

In order to evenly distribute the heat applied by the infrared heater 8 to the wheel 26, the suspension system 14 also carries a rotational system 27 comprising a motor 13 having an output gear 12, and a rotator disk 11 (See FIGS. 1-3). The rotator disk 11 have an outer perimeter that is configured to engage with an outer circumferential portion of the wheel 26 such that when the rotator disk 11 is turned by the motor 13 in a first rotational direction, the wheel 26 is thus turned by the rotator disk 11 in a second rotational direction, opposite the first rotational direction. The engagement of the outer perimeter of the rotator disk 11 and the circumferential portion of the wheel 26 may be frictional. In some embodiments, the motor 13 comprises a stepper motor that can be operated by a controller (not shown) to vary speed, rotational direction, or total number of turns or partial turns achieved. The output gear 12 of the motor 13 may or may not have an optional gearbox in between it and the motor 13. The rotator disk 11, either on its maximum diameter, or at a stepped, smaller diameter, may include teeth that engage with teeth of the output gear 12. Thus, the rotator disk 11 may also act as a reduction gear, such that its rotational speed is less than that of the output gear 12.

Returning to FIG. 1, a user an adjust the longitudinal location of each of the individual heating and rotation units 4, 5, 6, 7 in relation to the wheels 26, and can them secured them to the base 29 with the clamps 15 and locking nuts 16. Turning to FIG. 3, the infrared heater 8 comprises an infrared light 8A and a reflector 8B coupled to each other. The reflector 8B is configured to focus the radiant heat from the infrared light 8A on the wheel 26.

Figure 4:
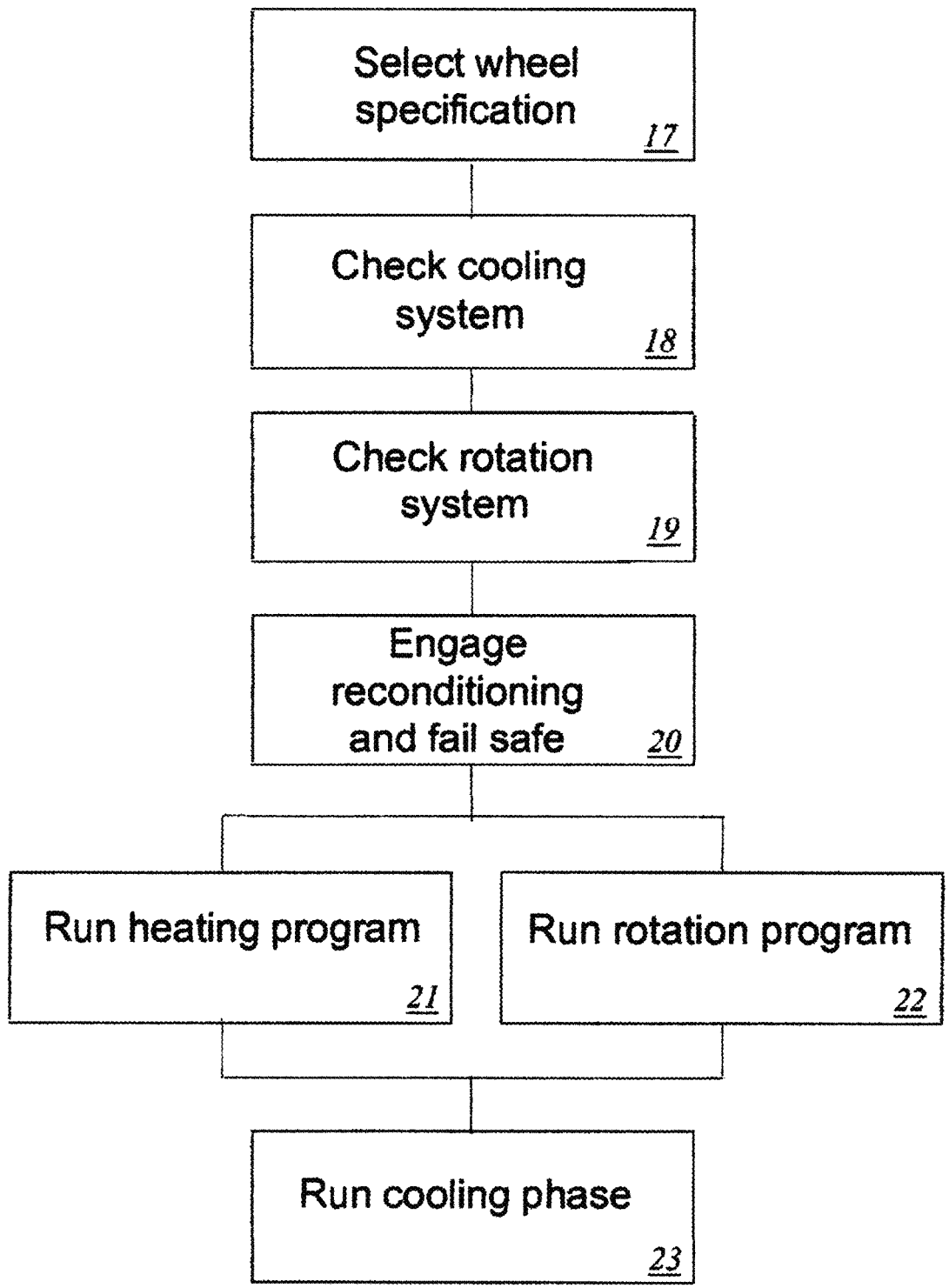
FIG. 4 is a process for performing reconditioning of one or more polymeric wheels.

The reconditioning system 30 may be manually operated, or may be operated by a timer, which may be as simple as a clock, or may be a controller (not shown), such as a microcontroller. Turning to FIG. 4, a method is illustrated for operating the reconditioning system 30 to recondition one or more polymeric wheels 26. The user and/or reconditioning system 30 selects the correct wheel make, model, material, and/or size in step 17, and the reconditioning system 30 initiates its setting or presets automatically. The setting may use any one or more of the parameters listed in Table 1.

TABLE 1

| Parameters |
| --- |
| Heater power |
| Heater rise time, temperature |
| Heater rise time, power |
| Heat time |
| Heater initiation time |
| Heater termination time |
| Heater shutoff temperature |
| Fan initiation temperature |
| Fan initiation time, delay |
| Fan termination temperature |
| Wheel rotation rate (or alternatively, motor rpm) |
| Wheel rotation direction |
| Wheel step (rotational arc per step) |
| Number of wheel rotations |

The system checks the cooling system in step 18 and checks the rotation system in step 19. The checks may utilize internal sensors (thermocouples, thermistors, RTVs, tachometers, torque meter, etc.). These steps assure that the system 30 is functional and no damage will occur to the wheel 26, however these steps may be optional if these is a high level of confidence with the system 30. The reconditioning process begins in step 20. By balancing the power of heat applied, the wheel temperature reached, and/or the time of heat application (heating program, step 21), and controlling the distribution of heat on the wheel (rotation program, step 22), as well as cooling (step 23), if desired, the system 30 can assure that every rolling surface of the wheel 26 becomes reconditioned. Another manner of controlling the heat application, distribution, and removal processes is to measure the surface temperature of the wheel 26. This may be done using optical transmissivity or optical reflectivity of the wheel outer surface, using a pyrometer or an infrared temperature sensor, such as an infrared camera or infrared thermometer. During the cooling step 23, the system may be configured to rotate the wheel 26 at an increased rotational speed, to increase the convective heat transfer and speed up the cooling of the wheel 26.

In one embodiment, a polymeric wheel 26 is coupled to the reconditioning system 30, the polymeric wheel 26 having an outer surface including an abraded area, the abraded area having a first average surface roughness. Heat is then applied to the abraded area of the outer surface of the wheel 26 with one or more heater 8 of the reconditioning system 30, such that a substantial portion of the abraded area is transformed to have a second average surface roughness, the second average surface roughness less than the first average surface roughness. A temperature sensor senses the surface temperature of the wheel 26, and at when a threshold temperature (e.g., target temperature $T_t$) is reached (e.g., 200° C., or another temperature between 90° C. and 250° C., or between 150° C. and 250° C., or between 180° C. and 225° C., or between 200° C. and 220° C.). The motor 13 is then activated by the controller to turn the rotator disk 11, which in turn causes rotation of the wheel 26 (while heat is still being applied to the wheel 26 by the heater 8). Exemplary rotation speeds for the wheel 26 are between 20 seconds and 15 minutes per one full rotation, or between 1 minute and 10 minutes per one full rotation, or between 2 minutes and 8 minutes per one full rotation, or about 5 minutes per one full rotation. Five minutes per one full rotation can also be described as 0.2 RPM. It may be configured to continue rotating the wheel 26 after the heater 8 has been shut off, in order to continue the cooling of the wheel 26. Thus the wheel 26 may be rotated between the heater initiation time and the heater termination time, and the wheel 26 may continue to be rotated for a period after the heater termination time.

Figure 7:
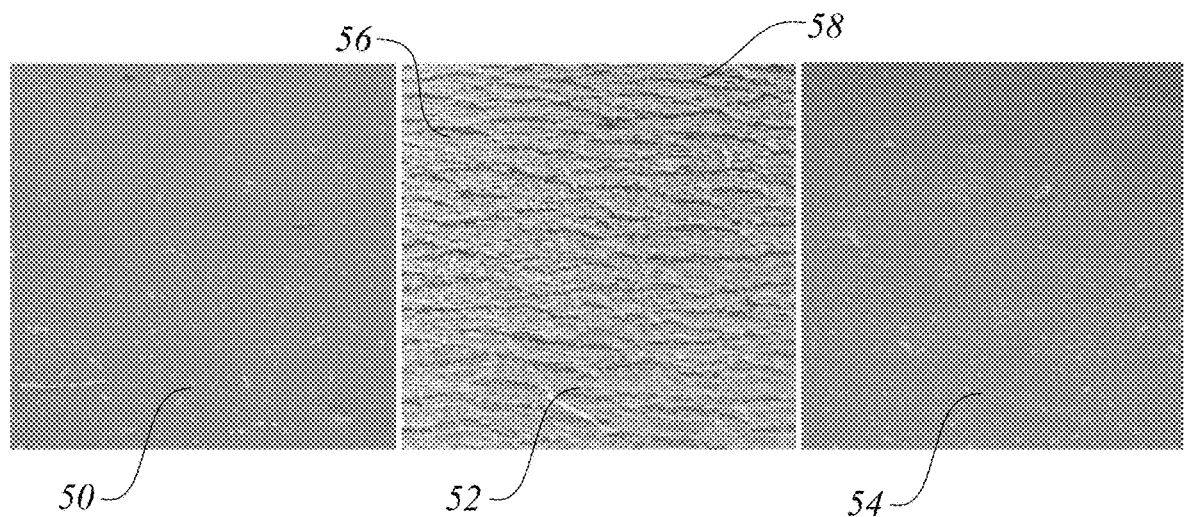
FIG. 7 are scanning electron microscopy (SEM) images of polymeric wheel surfaces at 13× magnification.
Figure 8:
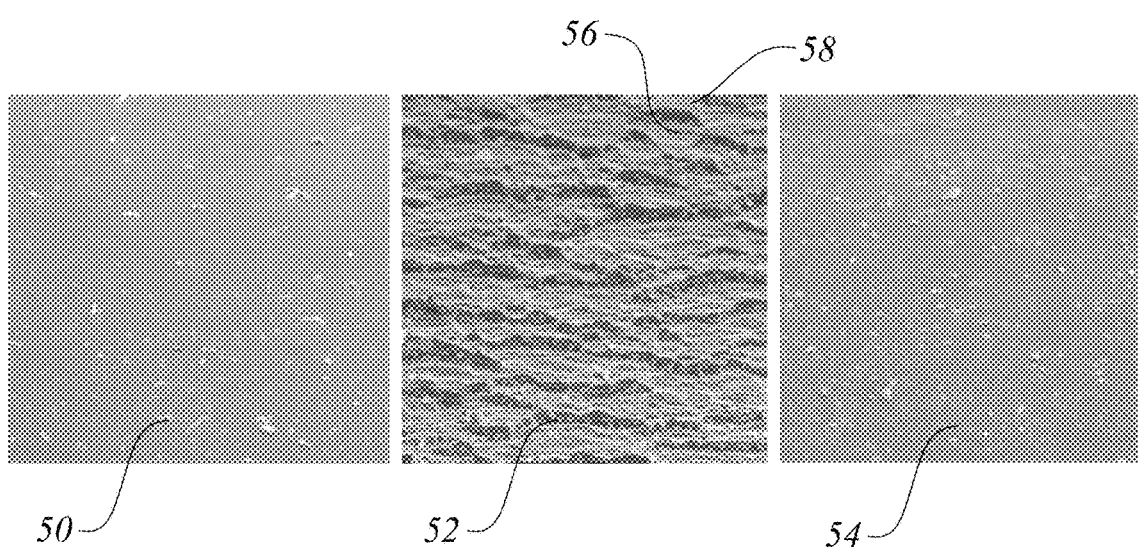
FIG. 8 are scanning electron microscopy (SEM) images of polymeric wheel surfaces at 30× magnification.

Three different polyurethane in-line skate wheels of the same model and size (Labeda® Addiction XXX, Precision Sports, Inc., Elsinore, Calif.), but each with differing usage and treatment history, were had their surfaces scanned by scanning electron microscopy (SEM). SEM Images were acquired of the rolling surfaces of three different wheels at both 13× magnification and 30× magnification. FIG. 7 illustrates 13× images of the surfaces of a new, unused wheel 50, a used, untreated wheel 52, and a used, treated wheel 54, while FIG. 8 illustrates 30× images of the surfaces of the new, unused wheel 50, the used, untreated wheel 52, and the used, treated wheel 54. The used, treated wheel 54 was reconditioned using the systems and methods disclosed herein, wherein the surface of the wheel 54 was controllably heated while the wheel 54 was rotated. The surface of the wheel 54 was then allowed to controllably cool. The wheels 50, 52, 54 were identical models. The SEM images of the surface of the used, untreated wheel 52 demonstrate significant grooves 56 and ridges 58 at both 30× and 13×, while the new, unused wheel 50 and the used, treated wheel 54 do not. The used, treated wheel 54 is indistinguishable from the new, unused wheel 50 at 13×. The used, treated wheel 54 and the new, unused wheel 50 remain difficult to distinguish from each other at 30×. However, the used, untreated wheel 52 is clearly an outlier. The systems and methods disclosed herein, thus, significantly rejuvenate the surface of the polyurethane wheels such that a used, treated wheel 54 can made "like new," virtually possessing the morphology and performance of a new, unused wheel 50. Thus, the actual life of a polymeric wheel can be significantly lengthened, saving the user time, money, and trouble. Additionally, because of the reduced overall expenditure required for wheels, a user's budget can now allow for the purchase of higher quality, higher performance wheels, which may initially cost more, but whose life cycle is similarly increased by the systems and methods taught herein.

Figure 9:
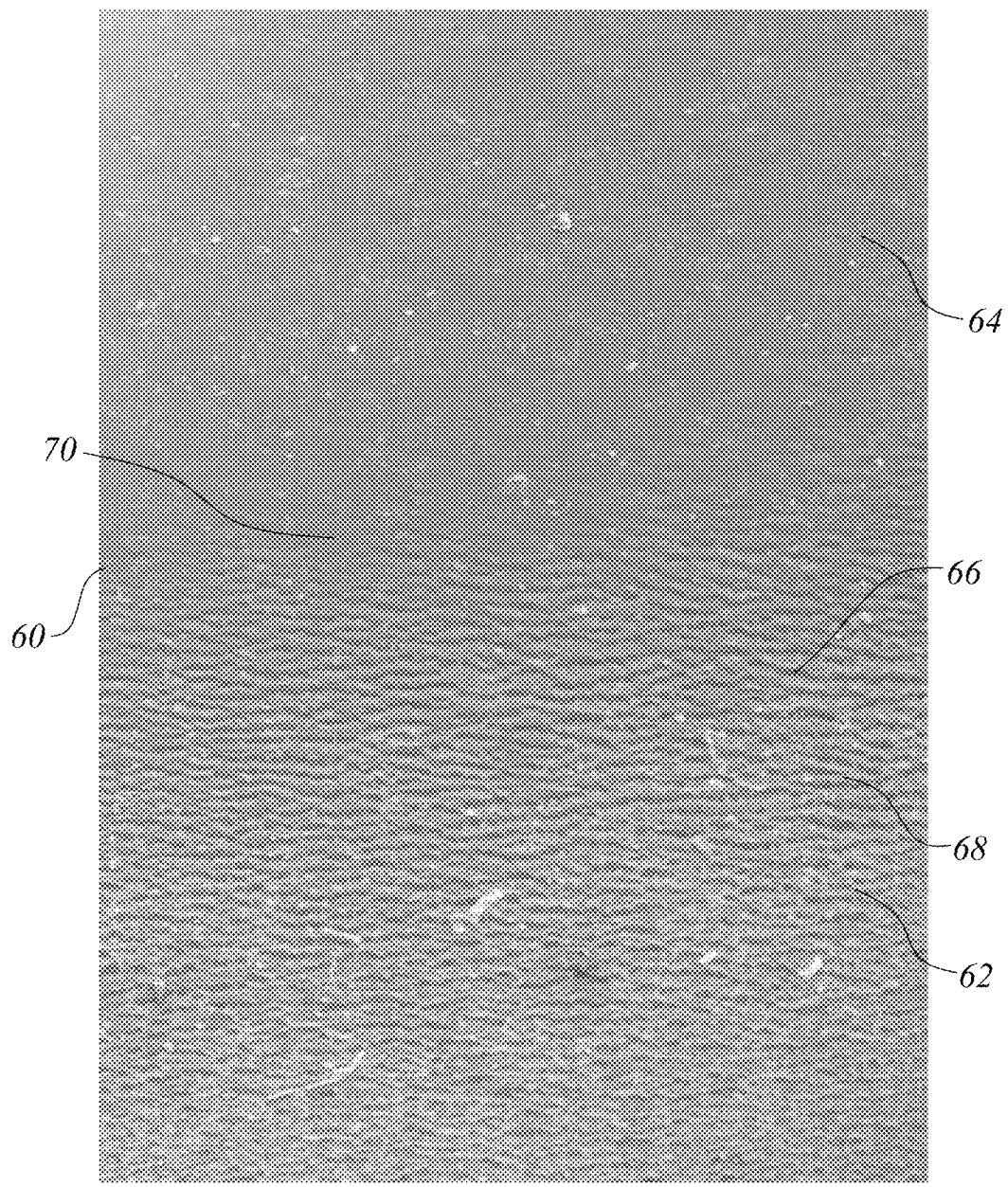
FIG. 9 is a scanning electron microscopy (SEM) image of a used polymeric wheel surface that has been partially treated, at 13×.

FIG. 9 illustrates an SEM image at 13× of the surface of a used polyurethane wheel 60 that has been partially treated using the systems and methods disclosed herein. A first section 62 has been shielded from the heat treatment, while a second section 64 has received the heat treatment. The first section 62 maintains a characteristic "worn" appearance having grooves 66 and ridges 68, while the second section 64 has returned to a smoother morphology, having significantly reduced average surface roughness. The reduction in average surface roughness that can be achieved using the systems and methods disclosed herein can be greater than or equal to 50%, greater than or equal to 75%, greater than or equal to 90%, and greater than or equal to 95%, and even greater than or equal to 99%. Thus, a "worn" surface having a first average surface roughness, can be reduced to a second average surface roughness that is less than 50% of the first average surface roughness, or less than 25% of the first average surface roughness, or less than 10% of the first average surface roughness, or less than 5% of the first average surface roughness, or even less than 1% of the first average surface roughness.

The cooling fan 9 (or other cooler) and/or the heat sink 10 of the reconditioning system 30 may be used simultaneously with the infrared heater 8 (or other heater) so that heat is applied only on a specific area of the surface of the a wheel, while protecting another portion of the surface of the wheel from the heat. Thus, the heated and non-heated zones on the wheel can be precisely controlled. A border 70 between first section 62 and the second section 64 has been achieved and is significantly abrupt, with very little transition zone. In other embodiments, the width of the transition zone may be purposely varied.

Figure 11:
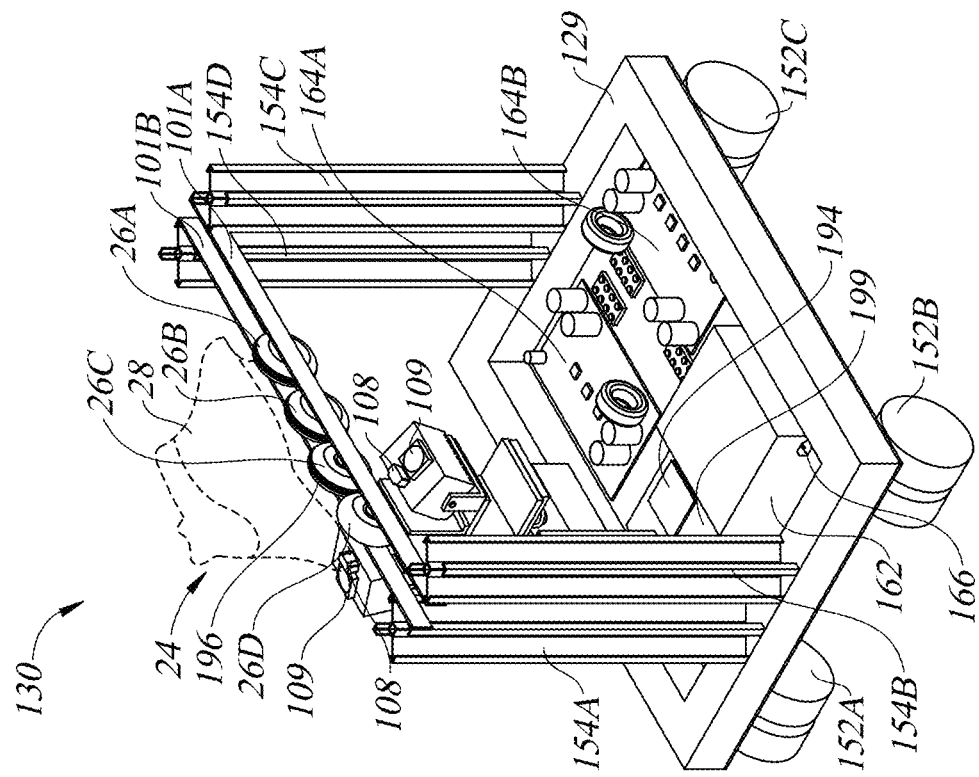
FIG. 11 is a perspective view of the reconditioning system of FIG. 10 with the cover removed.
Figure 10:
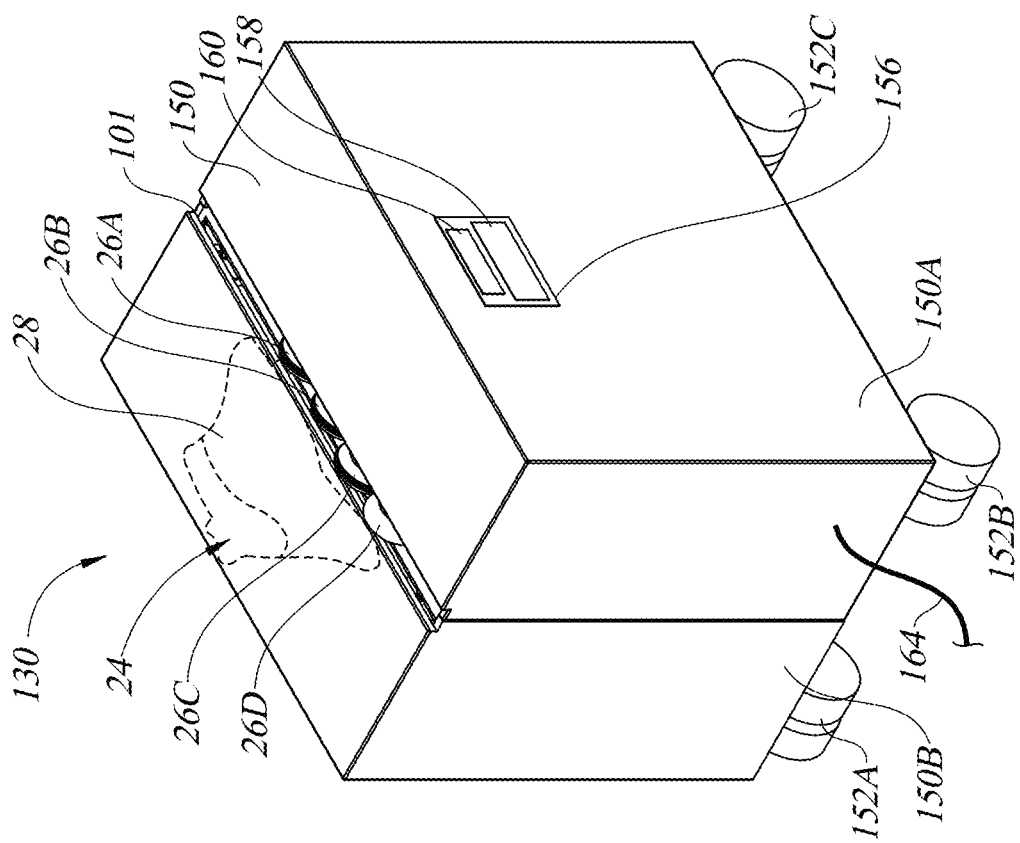
FIG. 10 is a perspective view of a reconditioning system according to an embodiment of the present disclosure with an in-line skate carried therein.
Figure 12:
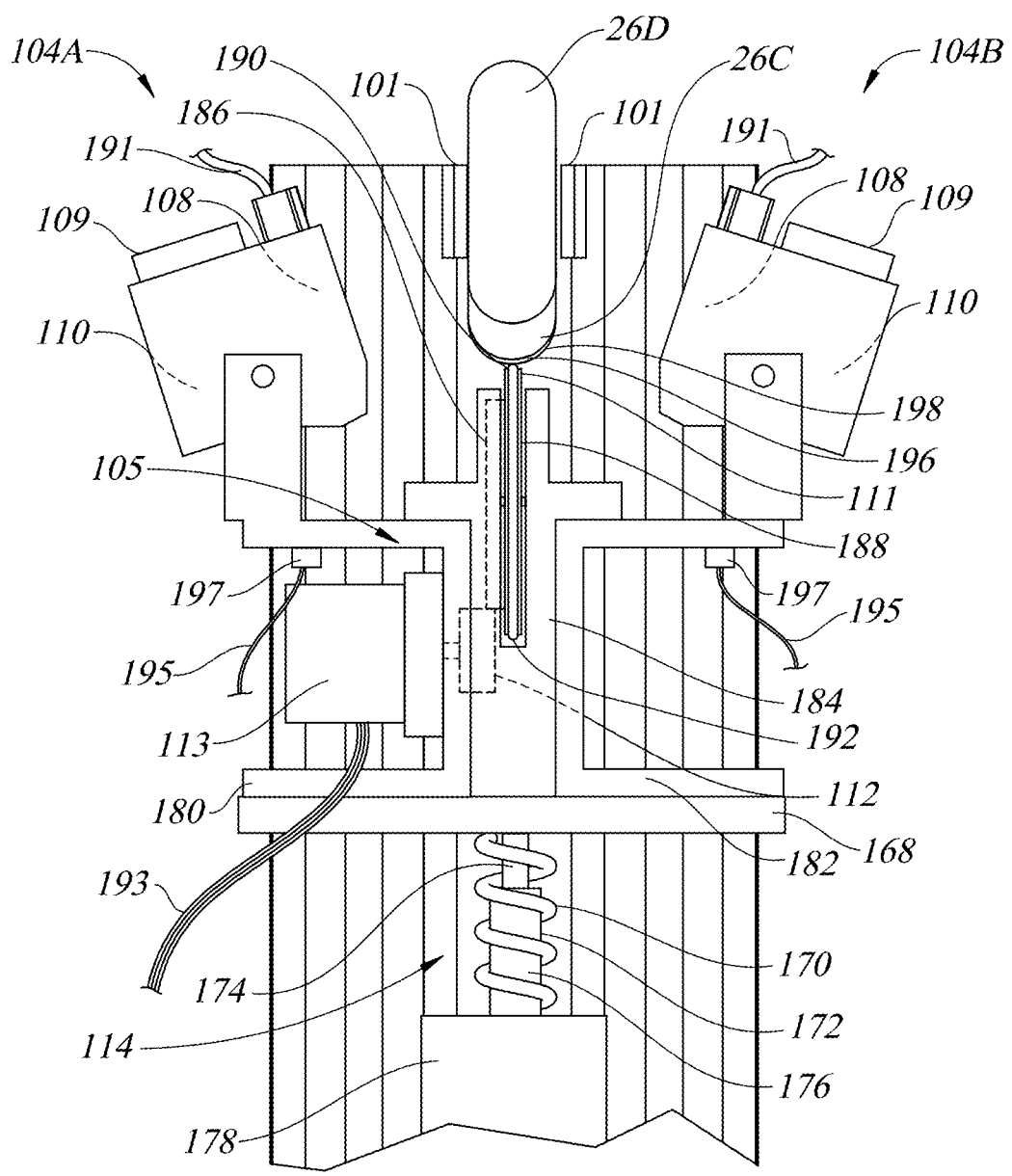
FIG. 12 is an internal rear view of the rotation unit and heating units of the reconditioning system of FIG. 10.

FIGS. 10-12 illustrate a reconditioning system 130 for reconditioning wheels 26 of an in-line skate 24 having a skate boot 28 and wheels 26A, 26B, 26C, 26D. The reconditioning system 130 has a cover 150 including a first cover half 150A and a second cover half 150B. Each of the cover halves 150A, 150B is configured to be removable from the base 129. The base 129 includes wheels 152A-C and 152D (not shown). At least two of the wheels 152A-D are connected to the base 129 with swivels to aid mobility and steering, if moved. In some embodiments, all of the wheels 152A-D are connected to the base 129 with swivels. Two lateral holding bars 101A, 101B are coupled to the base 159 via vertical supports 154A, 154B, 154C, 154D. The lateral holding bars 101A, 101B may be held static in relation to each other, or may be adjustable with respect to each other, as with the lateral holding bars 1 of the reconditioning system 30 of FIGS. 1-2. As shown in FIG. 10, the cover 150 includes a user interface 156 including controls 158 and a display 160. The user interface 156 may comprise any type of interface system, including, but not limited to a graphic user interface (GUI). The controls 158 may include mechanical buttons, or touch screen buttons or designs, such as resistive or capacitive touch screens. In some embodiments, the capacitive touch screen may include surface capacitive or projected capacitive actuation. In other embodiments, the touch screen may include infrared (IR) touch or surface acoustic wave (SAW) technology. The display 160 may include any type of visual display, including but not limited to: LED, LCD, TFT, ELD, PDP, or QLED. In other embodiments, the display may comprise audio commands or audio information, with or without the visual elements.

Figure 14:
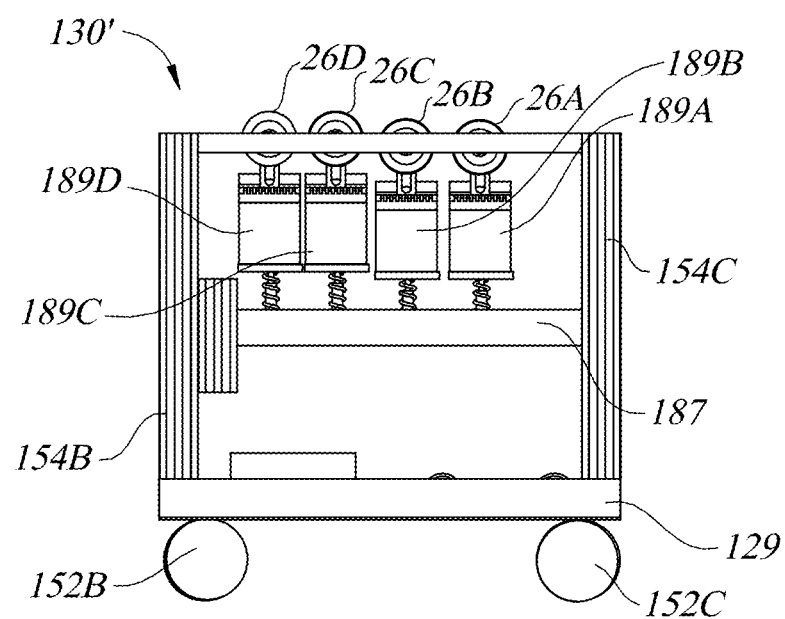
FIG. 14 is an alternative embodiment of the reconditioning system of FIGS. 10 and 11, according.

The reconditioning system includes a power supply 162, which can be connected to facility electricity via a power cord 164 which is configured to plug into a power entry module 166 (socket). In some embodiments, the power supply 162 may comprise a 650 Watt power supply unit. The power supply 162 is electrically coupled to a first AC to DC converter 164A and a second AC to DC converter 164B, though in other embodiments, a single AC to DC converter 164 may be used. Turning to FIG. 12, the AC to DC converters 164A, 164B are configured to output DC voltage to power a first heating unit 104A and a second heating unit 104B, respectively. The DC voltage output from one or both of the AC to DC converters 164A, 164B may also be used to power a rotation unit 105. In the reconditioning system 130, the heating units 104A, 104B and the rotation unit 105 are configured to recondition each of the wheels 26A-D, one at a time. Thus, by having only two heating units 104A, 104B and a single rotation unit 105, the cost of the reconditioning system 130 can be significantly decreased in relation to the reconditioning system 30 of FIG. 1, which has multiple individual heating and rotation units 4, 5, 6, 7. The skate 24 may be placed such that a first wheel (wheel 26D in FIG. 11) is in operating proximity, adjacent to the heating units 104A, 104B and the rotation unit 105. Then, after the wheel 26D is reconditioned, the skate 24 can be moved with respect to the reconditioning system 130 such that another wheel is in operating proximity, adjacent to the heating units 104A, 104B and the rotation unit (e.g., wheel 26C in FIG. 12). The skate 24 is then moved accordingly in relation to the reconditioning system, to treat each of the other wheels 26B, 26A. In other embodiments, an automatic, motor-driven slide may be incorporated into the lateral holding bars 101A, 101B, or an equivalent longitudinal displacement system, such that each wheel is automatically placed in operating proximity to the heating units 104A, 104B and the rotation unit 105 for the start and end of its reconditioning cycle. Finally, a reconditioning system 103' according to an alternative embodiment is shown in FIG. 14, and includes a first pair of heating units 189A configured to treat a first wheel 26A, a second pair of heating units 189B configured to treat a second wheel 26B, a third pair of heating units 189C configured to treat a third wheel 26C, and a fourth pair of heating units 189D configured to treat a fourth wheel 26D. The four individual pairs of heating units 189A-D are each carried on a longitudinal support 187 extending between the vertical supports 154A-D. Each of the heating units 189A-D can be configured to be adjustable (up, down) to accommodate different wheel diameters or wheel types. The boot 28 of the skate 24 is not shown in FIG. 14 for clarity. Each of the heating unit pairs 189A-D may be adjustable along the longitudinal support 187 (e.g., left and right in FIG. 14) to match the location of the wheels 26A-D in the skate 24. In some embodiments, only three of the heating unit pairs 189 need be adjustable along the longitudinal axis. In some embodiments, none of the heating unit pairs 189A-D are adjustable along the longitudinal axis, each being large enough or long enough to treat a large array of different skate arrangements. The heating units 189A-D are configured to treat the four wheels 26A-D simultaneously, but may also be programmed to treat the wheels serially, or in any particular order. In some embodiments a second wheel 26B may heated while a first wheel 26A is no longer being heated, but it still being cooled.

Each heating unit 104 comprises an infrared heater 108 and a cooling fan 109, the infrared heater 108 configured to apply heat to the wheel 26, as described in relation to infrared heater 8, and the cooling fan 109 configured to control the amount of heat applied to the wheel 26, as described in relation to the cooling fan 9. The infrared heater 108 may comprise an infrared light and a reflector, such as the infrared light 8A and a reflector 8B of the infrared heater 8. Each heating unit 104 also includes a heat sink 110 (FIG. 12), configured to remove excess heat from the heating area, as described in relation to the heat sinks 10. Wires 191 are configured to carry power and, as needed, information to the heating unit 104. The heating units 104A, 104B and the rotation unit 105 are carried by a platform 168 that is supported by a suspension system 114 comprising a spring 170 and a telescoping assembly 172. The telescoping assembly comprises an inner shaft 174 which is slidable within an outer cylinder 176. A support 178 carries the outer cylinder 176, and may be attached to one or both of the vertical supports 154A, 154B, and/or attached to the base 129. The center of the infrared light 8A may be placed a convenient distance from the wheel 26 to optimize the distribution of heating. For example, a distance between the center of the light (e.g., bulb) and the surface of the wheel 26 may be between about 5 mm and 25 mm, or between about 10 mm and 20 mm, or between about 12 mm and 18 mm.

The platform 168 is coupled to a first U-shaped bracket 180 and a second U-shaped bracket 182. The first U-shaped bracket 180 carries the heating unit 104A and the second U-shaped bracket 182 carries the heating unit 104B. A motor 113 is coupled to the first U-shaped bracket 180, and an is configured to rotate an output gear 112. Wires 193 are configured to carry power and, as needed, information to the motor 113. The output gear 112 rotationally engages a rotator disk 111, which is rotationally held by a central frame 184. Rotation of the output gear 112 in a first rotational direction by the motor 113 causes rotation of the rotator disk 111 in a second rotational direction, opposite the first rotational direction. The engagement between the output gear 112 and the rotator disk 111 is shown in FIG. 12 as a spur gear arrangement, with the output gear 112 of the motor 113 serving as the driving gear and a toothed side extension 186 of the rotator disk 111 as the driven or follower gear. However, any number of gearing arrangements may be used, including, but not limited to helical gears, skew gears, bevel gears, hypoid gears, worm and worm wheel, or planetary gears. Alternatively, the engagement may be magnetic, with the output gear 112 replaced by a first magnet or series of magnets having multiple circumferentially-arrayed poles and the rotator disk 111 including a second magnet or series of magnets having circumferentially-arrayed poles, such that negative poles of one correspond to positive poles of the other, and such that a pole of the driving magnet forces the movement of a like pole of the driven magnet. Alternatively, one of the two magnets may be replaced by a series of magnetic material, such as iron, or 400 series stainless steel.

The rotator disk 111 comprises a rigid wheel portion 188 having a circumferential groove 190 into which an o-ring 192 is carried. The o-ring 192 may be adhesively or epoxy bonded into the groove 190, or the coefficient of friction between the o-ring 192 and the material of the rigid wheel portion 188 may be high enough such that the friction causes the o-ring 192 to rotate in unison with the rigid wheel portion 188, even when the o-ring 192 is contacted externally (e.g., by a wheel 26). The o-ring 192 may comprise an elastomer, such as silicone or EPDM rubber. Returning to FIG. 11, a motor controller 194 is configured to drive the motor 113. The motor 113 may comprise a stepper motor, and the motor controller 194 may comprise a stepper motor driver board, for example, a 5 Volt DC, 4 phase system. The converted DC voltage from one or both of the AC to DC converters 164 thus powers the motor 113 via the motor controller 194, such that the output gear 112 rotates the rotator disk 111. With the skate 24 in place, the o-ring 192 of the rotator disk 111 engages a wheel 26 of the skate 24. FIG. 11 shows the wheel 26D after it has been reconditioned by the reconditioning system 130, thus no abraded area is visible on wheel 26D. However, the wheels 26A-C are shown untreated, with abraded areas 196 visible. In FIG. 12, the skate 24 position has been adjusted such that wheel 26C is in operating proximity, adjacent to the heating units 104A, 104B and the rotation unit 105. The o-ring 192 is shown in FIG. 12 engaging the wheel 26C outer diameter. Though the arrangement in FIG. 12 shows the o-ring 192 (and thus the maximum diameter of the rotator disk 111) engaging the rotator disk 111 at its maximum outer diameter, in other embodiments, the o-ring 192 of the rotator disk 111 may be configured to engage the wheel 26C at a sub-maximum outer diameter, such as diameter 198 somewhat lateral on the wheel 26C.

A temperature sensor 197 is carried on each of the U-shaped brackets 180, or may be carried on any other element that allows the temperature sensor 197 to be in proximity to the wheel 26. Each temperature sensor 197 may comprise an infrared sensor. Wires 195 carry information from each temperature sensor 197 and may also be used to power the temperature sensor (if required). The temperature sensor 197 may comprise an infrared sensor model MLX90614ESF-BCI produced by Melexis Technologies NV. In some embodiments, a single temperature sensor 197 may be used, but in other embodiments, multiple temperature sensors 197 may be used. For example, one infrared sensor may be utilized on each side of the wheel 26 being treated, as shown in FIG. 12.

The operation of the reconditioning system 130 is controlled by a controller 199 (FIG. 11) via commands input by a user from the controls 158 of the user interface 156. The controller 199 is powered by the DC voltage from one or both of the AC to DC converters 164, and may comprise a controller board having a microcontroller, such as the 8-bit AVR ATmega 328P manufactured by Atmel Corporation of San Jose, Calif., USA. The controller 199 is configured to run the entire reconditioning cycle on each wheel 26, by operating the motor 133 (e.g., via the motor controller 194) and the infrared heaters 108 (e.g., infrared light) and cooling fans 109. Standard reconditioning programs may be pre-programmed into the controller 199 having specific values for any of the parameters listed in Table 1, or other parameters. The controller 199 may also be programmable by the user, such that particular reconditioning programs may be developed and optimized for each type of wheel and/or for several levels of wear to a wheel. The precise control of heat application aids in also allowing a relatively thin surface thickness to be heated such that it can reform, reflow, or otherwise change its morphology, while protecting the bulk of the wheel 26 from reaching temperatures which would deform the wheel 26. The temperature sensors 197 also output information to the controller 199, and the controller 199 is configured to use this information (e.g., surface temperature of the wheel 26) at least partially to control the amount of heat applied to and/or the amount of heat removed from the wheel 26. The controller 199 may use the data received from the temperature sensors 197 to control the heating units 104A, 104B (infrared heater 108 and a cooling fan 109) and the rotation unit 105. In some embodiments, the controller 199 may comprise a simple timer or a series of timers, each which can be set to allow a procedure to occur for a certain amount of time and which can be user initiated.

Figure 13:
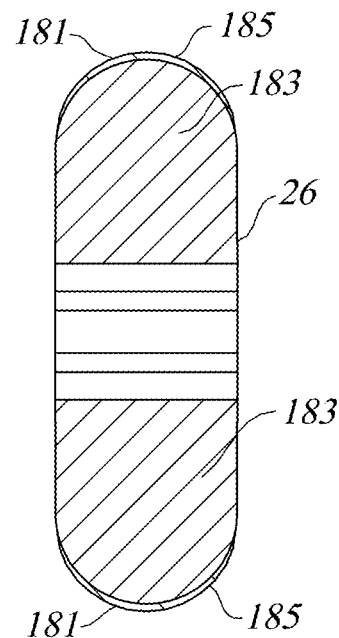
FIG. 13 is a cross-sectional view of a polymeric wheel undergoing reconditioning, according to an embodiment of the present disclosure.

FIG. 13 illustrates a cross-section of a wheel 26 during a reconditioning routine or process with the reconditioning system 130. The non-polymeric portion (e.g., bearings, hub, spacer) of the wheel 26 has been simplified. An outer shell 185 of the wheel 26 is being heated above the target temperature $T_t$, while the bulk of the wheel structure 183 is maintained below the target temperature $T_t$. The target temperature $T_t$ is high enough to allow at least the outer surface 181 of the wheel 26 to reform, reflow, or otherwise change its morphology or characteristics, to provide a smoother, improved surface. In some embodiments, the target temperature $T_t$ is between about 200° C. and about 215° C., or between about 205° C. and about 210° C. In some embodiments, the controller 199 is configured to cause the rotation unit 105 to begin rotating the wheel 26 when signals from one or more of the temperature sensors 197 indicate that the target temperature $T_t$ is reached, and to maintain the rotation until the signals from one or more of the temperature sensors 197 indicate that the temperature has dropped below the target temperature $T_t$. The power up and power down of the heating unit 104 may also be controlled with at least some dependency on the temperature measured by one or more of the temperature sensors 197.

Having temperature sensors 197 on both sides of the wheel 26 being treater, as in FIG. 12, can optimize substantial treatment of the wheel 26, such that the wheel 26 achieves full treatment temperature and sufficient treatment time, such that a substantial portion of the abraded area is caused to reform, reflow, or otherwise change its morphology or characteristics, such that the outer surface at the abraded are becomes smoother. In some embodiments, depending on the type of polymer, this may also or alternatively allow for some curing, cross-linking, or other physical changes. The temperature information of the wheel 26 from the temperature sensors 197 may be utilized by the controller 199 to efficiently control the on time and off time of the infrared heater 108 and/or the cooling fan 109, thus saving energy and cost. The controller 199 is configured to determine (from the temperature data) and control when one or both heaters 108 should power on, increase their power, decrease their power, or power off. The controller 199 is configured to determine (from the temperature data) and control when one or both fans 109 should power on, increase their power (rotation speed), decrease their power (rotation speed), or power off.

A vendor that utilizes a reconditioning system 30, 130 in their business (a skating rink, roller hockey rink, or other recreational space) may use a process for reconditioning the skates 24 of users by: (1) obtaining a skate 24 from the user, (2) coupling the skate to the reconditioning system 30, 130, (3) applying heat to an abraded area on the outer surface of a wheel 26 of the skate 24 with one or more heater of the reconditioning system 30, 130, such that an average surface roughness of the abraded area is reduced, and (4) removing the skate 24 from the reconditioning system 30, 130. The vendor may then return the skate 24 to the user in exchange for payment, or as an added value to another purchase (rink usage time, roller hockey league entry, etc.). The vendor may further control the process by the use of an application (app) that can be accessed by the user and vendor alike, on a mobile device or other computer.

While the foregoing is directed to embodiments of the present disclosure, other and further embodiments may be devised without departing from the basic scope thereof. The polymeric wheels and reconditioning systems and methods described herein may be used for wheels of in-line skates, roller skates or skateboards, but also for other wheeled sporting implements, such as golf carts or scooters, or even wheeled or caster-based non-sporting implements, such as baggage carrying carts, dollies, or hand-trucks.

The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

What is claimed is:

1. A method for reconditioning a rollable wheel, comprising:
    coupling a polymeric wheel to a reconditioning system comprising a rotator and one or more heaters, the polymeric wheel intended for rolling contact with a ground-based performance surface and having an outer surface including an abraded area, the abraded area having a first average surface roughness, the reconditioning system configured to allow manual placement and manual removal of the polymeric wheel by a user; and
    applying heat in a non-contact manner to the abraded area of the outer surface with the one or more heater of the reconditioning system while rotating the wheel with the rotator, to cause a substantial portion of the abraded area to be transformed to have a second average surface roughness, the second average surface roughness less than the first average surface roughness.

2. The method of claim 1, wherein the second average surface roughness is less than 50% of the first average surface roughness.

3. The method of claim 1, wherein the second average surface roughness is less than 25% of the first average surface roughness.

4. The method of claim 1, wherein the rotator comprises a disk having an outer perimeter, the outer perimeter configured to engage the outer surface of the polymeric wheel such that rotation of the disk in a first rotational direction causes rotation of the polymeric wheel in a second rotational direction, the second rotational direction opposite the first rotational direction.

5. The method of claim 4, wherein the outer perimeter of the disk comprises an elastomer.

6. The method of claim 4, wherein the outer perimeter of the disk is defined by a resilient ring carried on a rigid base of the disk.

7. The method of claim 1, wherein the rotator comprises a motor.

8. The method of claim 1, wherein the application of heat is initiated at an initiation time, and further comprising:
    terminating or significantly reducing the application of heat at a termination time, wherein the polymeric wheel is rotated by the rotator between the initiation time and the termination time.

9. The method of claim 1, further comprising:
    cooling the polymeric wheel.

10. The method of claim 9, wherein the cooling of the polymeric wheel is performed after the application of heat to the polymeric wheel.

11. The method of claim 9, wherein the cooling of the polymeric wheel is at least partially executed by a fan of the reconditioning system.

12. The method of claim 9, wherein the cooling of the polymeric wheel is at least partially executed by forced fluid convection.

13. The method of claim 12, wherein the cooling of the polymeric wheel is at least partially executed by forced air convection.

14. The method of claim 1, further comprising:
    removing excess heat at or adjacent the polymeric wheel with one or more heat sinks of the reconditioning system.

15. The method of claim 1, wherein the one or more heater comprises one or more infrared heater.

16. The method of claim 15, wherein at least one of the one or more infrared heater is coupled to a reflector.

17. The method of claim 1, further comprising:
    measuring a temperature on the surface of the polymeric wheel.

18. The method of claim 17, wherein measuring the temperature comprises measuring the temperature with an infrared sensor of the reconditioning system.

19. A method for reconditioning one or more rollable wheels of a roller skate, comprising:
    obtaining a skate comprising a foot attachment portion having one or more polymeric wheels coupled thereto and rotatable thereon, at least one of the one or more polymeric wheels having an outer surface including an abraded area;
    coupling the skate to a reconditioning system;
    applying heat in a non-contact manner to the abraded area of the outer surface with one or more heater of the reconditioning system while rotating the at least one of the one or more polymeric wheels, to cause an average surface roughness of the abraded area to be reduced; and
    removing the skate from the reconditioning system.

20. The method of claim 19, wherein the skate is obtained from an owner or guardian of the skate, and further comprising:
    returning the skate to the owner or guardian of the skate.

21. The method of claim 19, wherein the reconditioning system further comprises a rotator.

22. The method of claim 21, wherein the rotator comprises a motor.

23. The method of claim 19, wherein the at least one of the one or more polymeric wheels comprises polyurethane.

24. The method of claim 1, wherein the wheel comprises polyurethane.

* * * * *